C. W. SHARTLE.
PROCESS OF MANUFACTURING PAPER PULP.
APPLICATION FILED APR. 23, 1919.
1,405,944.
Patented Feb. 7, 1922.
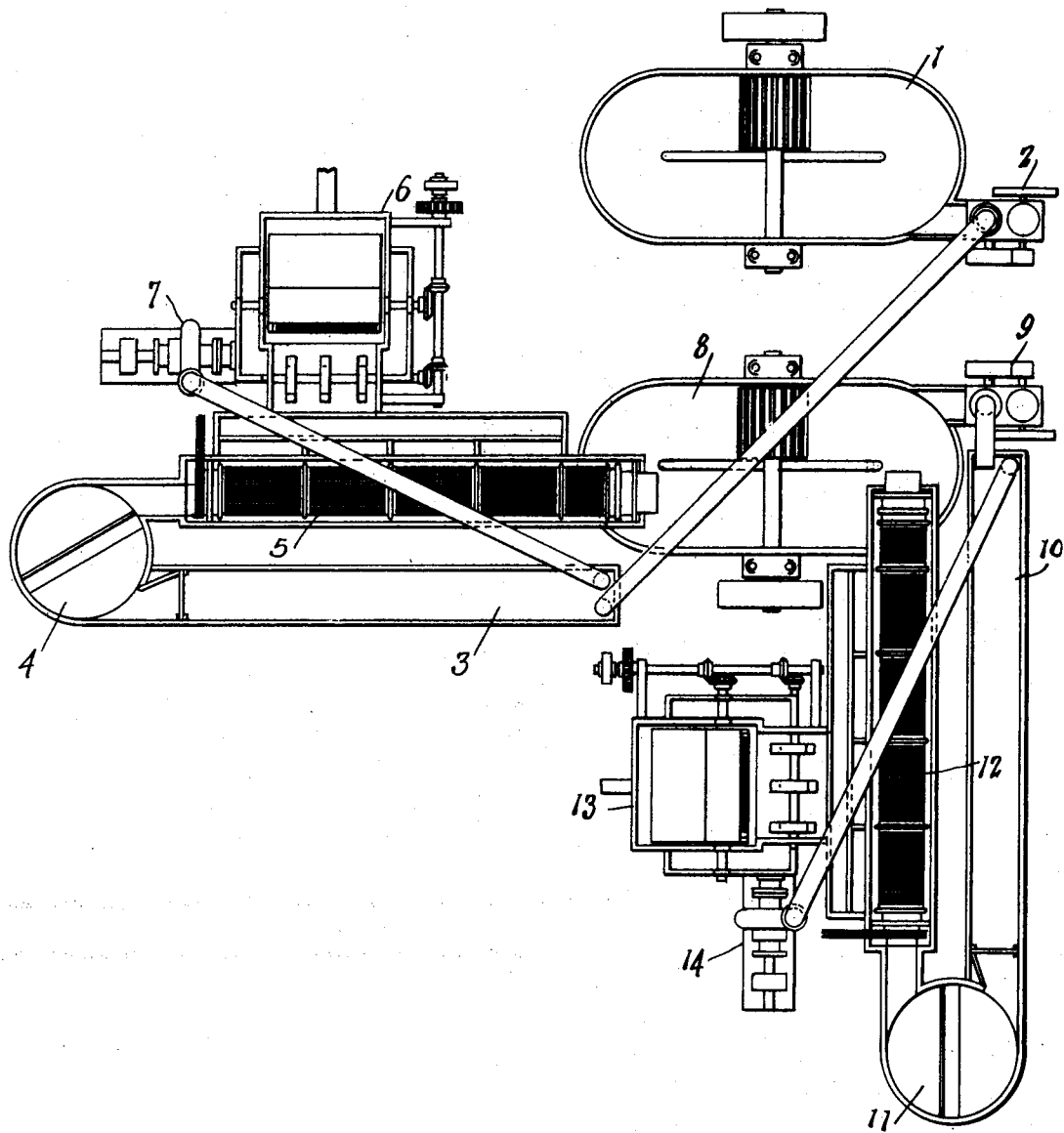
Inventor
Charles W. Shartle,
Joclumin + Joclumin,
Attorneys

UNITED STATES PATENT OFFICE.

CHARLES W. SHARTLE, OF MIDDLETOWN, OHIO, ASSIGNOR TO THE SHARTLE CONTINUOUS BEATER COMPANY, OF MIDDLETOWN, OHIO, A CORPORATION OF OHIO.

PROCESS OF MANUFACTURING PAPER PULP.

1,405,944.  Specification of Letters Patent.  Patented Feb. 7, 1922.

Application filed April 23, 1919. Serial No. 292,149.

*To all whom it may concern:*

Be it known that I, CHARLES W. SHARTLE, a citizen of the United States, residing at Middletown, in the county of Butler and State of Ohio, have invented certain new and useful Improvements in Processes of Manufacturing Paper Pulp, of which the following is a specification, reference being had therein to the accompanying drawing.

This invention relates to a process of manufacturing paper pulp.

The primary object of my invention is to provide for the reduction of the variable forms of raw material to pulp of uniform consistency so that paper of even grade and quality may be produced therefrom.

A difficulty constantly experienced in paper manufacturing results from the lack of uniformity in the raw material used. Rags which constitute the main element of raw material vary from the finest gauzes and silks to heavy burlap, canvas, carpets, etc. Also a considerable amount of foreign matter, such as wood, metal and other materials which do not yield readily to the processes of reduction and which may damage the machinery is usually found in the raw material in the promiscuous form in which it is received and treated in the first steps of reducing the material to pulp. The condition of the raw stock thus results in difficulty in reducing the same to pulp of uniform consistency and therefore in maintaining the grade and quality of the paper.

To overcome these difficulties I have evolved a new process in paper manufacturing whereby uniformity in reduction of the raw material is realized, pulp of even consistency is obtained and a better and more uniform grade of paper is produced. My improved process also facilitates production, a greater output being realized upon any given basis of operation. Thus the invention enters vitally into the cost of production, as with increased output and the gain in quality due to greater uniformity in the reduction of the raw materials to pulp material advantages are realized.

In the accompanying drawing one form of paper making apparatus is diagrammatically illustrated in which my improved process may be applied.

As here shown the raw paper stock is fed continuously into a beater 1, where it is reduced to an initial state of coarse consistency and then overflows into a pump 2. The mass is thence pumped into a settling box 3 in which heavy foreign substances, such as metal, sand, small pieces of rock, etc., become separated from the pulp and sink to the bottom of the tank.

The material passes from the settling box 3 through a whirl-pool 4, where light foreign substances rise to the top which may be skimmed off; thence the material flows over a screen 5 which acts to separate the fine material from the coarse; the fine material passing through the screen, flows into an extracting machine 6 in which the water is extracted from the material by a pump 7 and returned to the settling box 3. The finished pulp then passes from the extractor into a stuff chest (not shown) ready for the next step or paper forming operation.

The coarse material not fine enough to pass through the screen 5 is scraped off the screen into a second beater 8 having finer and sharper knives where it is further reduced to finer quality. The mass of material then flows into a pump 9 and from thence is pumped into a settling box 10 where further separation of foreign substances from the pulp may take place in the same manner as in the settling box 3. The mass of material then flows through a whirl-pool 11 onto a screen 12. The material which is fine enough to pass through the screen then flows into a second extractor 13, the water being extracted from the material and returned to the settling box 12 by a pump 14, and the finished material passing from the extractor to a stuff-chest in the same manner as from machine 6.

The material remaining upon the screen 12 is scraped back into the beater 8 and thus continued in the sequence of operation described above until it is reduced to a consistency which will permit it to pass through the screen 12 and thence through the extractor 13 into the stuff-chest ready for the paper forming operation.

It is obvious, of course, that my improved process of manufacture is not limited to the exact details of arrangement here shown, but what I have evolved in the invention and wish to cover comprehensively in the appended claims is a continuous reducing process in the manufacture of pulp wherein the raw material is first reduced to an initial state of coarse consistency by a grinding operation in which dull knives are used which will not be damaged readily by foreign substances mixed with the raw material; then subjecting the material to a settling process, screening and extracting operations and a further continuous reduction process, continuing the process through a sequence of operations until the entire mass of material is reduced to uniform consistency ready for the sheet or web forming operations of the press.

Having thus fully described my invention, what I claim as new and desire to secure by Letters Patent, is:—

1. In the manufacture of paper pulp, the herein described process consisting in reducing the raw material to an initial consistency, in moving said mass of material through a process of separation whereby the fine portion thereof will be separated from the mass and immediate output made thereof, in delivering that portion of said material remaining over to a separate and finer process of reduction and separation in repeated sequence whereby said remaining portion will be reduced to required consistency and a separate output made of it.

2. In the manufacture of paper plup, the herein described process consisting in reducing the raw material to an initial consistency, in moving said mass of material through a process of separation whereby the fine portion thereof will be separated from the mass and immediate output made thereof, in delivering that portion of said material remaining over to a separate and finer process of reduction in repeated sequence whereby said remaining portion will be reduced to required consistency and a separate output made of it.

3. In the manufacture of paper pulp, the herein described process consisting in reducing the raw material by a grinding operation to an initial consistency, in moving the mass of material successively through a settling, screening and extracting operation, whereby the fine portion thereof will be reduced to required consistency and immediate output made thereof, in passing the remaining portion of said material through a separate grinding, settling, screening and extracting operation in repeated sequence until the entire mass is reduced to required consistency and a separate output made of it.

4. In the manufacture of paper pulp, the herein described process consisting in reducing the raw material by a grinding operation to an initial consistency, in subjecting the mass of material successively to a screening and extracting operation, whereby the fine portion thereof will be reduced to required consistency and immediate output made thereof; and in subjecting the remaining portion of said material to a separate grinding, screening and extracting operation in repeated sequence until the entire mass is reduced to required consistency and a separate output made of it.

5. In the manufacture of paper pulp, the herein described process consisting in reducing the raw material by a grinding operation to an initial consistency, in subjecting the mass of material to a screening operation, whereby the fine portion thereof will be reduced to required consistency and immediate output made thereof; in subjecting the remaining portion of said material to a separate grinding and screening operation in repeated sequence until the entire mass is reduced to required consistency and a separate output made of it.

In testimony whereof, I affix my signature.

CHARLES W. SHARTLE.